United States Patent [19]

Pöppel

[11] Patent Number: 5,926,778
[45] Date of Patent: Jul. 20, 1999

[54] METHOD FOR TEMPERATURE COMPENSATION IN MEASURING SYSTEMS

[75] Inventor: Josef Pöppel, Fahlenbach, Germany

[73] Assignee: Temic Telefunken microelectronic GmbH, Germany

[21] Appl. No.: 09/015,785

[22] Filed: Jan. 29, 1998

[30] Foreign Application Priority Data

Jan. 30, 1997 [DE] Germany ............ 197 03 359

[51] Int. Cl.⁶ ................................. G01K 1/20
[52] U.S. Cl. ................ 702/130; 702/88; 702/99; 702/136; 73/766
[58] Field of Search ................ 702/99, 130, 44, 702/86–88, 136; 73/708, 727, 766; 324/103 P, 106

[56] References Cited

U.S. PATENT DOCUMENTS

| | | | |
|---|---|---|---|
| 3,671,860 | 6/1972 | Kettler et al. | 324/103 P |
| 4,101,056 | 7/1978 | Mattimoe et al. | 702/99 |
| 4,202,218 | 5/1980 | Romo | 73/766 |
| 4,437,164 | 3/1984 | Branch, III | 702/86 |
| 4,455,095 | 6/1984 | Bleiker | 702/136 |
| 4,651,292 | 3/1987 | Jeenicke et al. | |
| 4,966,034 | 10/1990 | Bock et al. | 73/708 |

FOREIGN PATENT DOCUMENTS

| | | |
|---|---|---|
| 3218511 | 3/1983 | Germany . |
| 2915319 | 7/1984 | Germany . |
| 3007747 | 5/1990 | Germany . |
| 4141065 | 6/1993 | Germany . |
| 4142680 | 7/1993 | Germany . |
| 4211997 | 10/1993 | Germany . |
| 4227727 | 2/1994 | Germany . |
| 4410705 | 10/1995 | Germany . |
| 19521530 | 12/1995 | Germany . |
| 4434318 | 3/1996 | Germany . |
| 19502858 | 7/1996 | Germany . |
| 04030478 | 3/1992 | Japan . |
| 04002170 | 7/1992 | Japan . |

*Primary Examiner*—John Barlow
*Assistant Examiner*—Bryan Bui
*Attorney, Agent, or Firm*—VENABLE; George H. Spencer; Robert Kinberg

[57] ABSTRACT

A method for temperature compensation in measuring systems that are dependent on the operating temperature and whose temperature dependency is caused by temperature-sensitive components that can be operated electronically, or are linked thermally with a neighboring electronically driven component which is already required for the measuring system. In the method according to the invention, the temperature-sensitive component or a neighboring component are operated in such a way that temperature compensation can be performed without any further auxiliary means such as, for example, an additional heating device. Temperature compensation of this kind can then take place in three different ways. In the one method, the temperature coefficient determined and utilized; in a second method the temperature-sensitive components of the system are heated up to a fixed operating temperature, which is the basis for all measurements, and in a third method a temperature-independent operating point is determined.

16 Claims, 5 Drawing Sheets

METHOD FOR TEMPERATURE COMPENSATION IN MEASURING SYSTEMS

BACKGROUND OF THE INVENTION

The invention relates to a method for temperature compensation in measuring systems which can also be part of an item of equipment, that are dependent on the operating temperature, and whose temperature dependency is caused by one or several temperature-sensitive components with a temperature coefficient, and that can be operated electronically or are linked thermally with a neighboring electronically driven component which is already required for the measuring system.

Numerous measuring systems such as, for example, an extinction sensor in washing machines, a light barrier in cash dispensers or pressure sensors in motor vehicles, contain temperature-sensitive components which behave differently at different temperatures. Especially in mass goods such as household appliances or motor vehicles, simple temperature-dependent components are used which display a high temperature sensitivity. For these applications, simple calibration or compensation methods are necessary that can best be performed at low cost in the microprocessor control that is provided in the item of equipment itself. In known systems, either the individual parts or the complete system are measured in terms of temperature sensitivity with respect to the measured quantity for the purpose of temperature compensation and stored in a variety of forms (table value, selection, EEPROM, etc.). When applied at a later time in the equipment, the derived values can be used in calculations if the ambient temperature is measured at the same time. As a rule, a typical or even a specific value is stored here for the temperature-sensitive components and this is taken for later calculations. The method for measuring the specific temperature sensitivity consists of measuring the temperature coefficients of each temperature-sensitive component before the equipment or measuring device is put into operation. In this method, the components are heated by a separate heating system and the results obtained at the different temperatures are stored as temperature coefficient, as characteristic curve, or as a pair of values.

However, in the subsequent calculations for temperature compensation it has been found to be very cost favorable if the typical temperature sensitivity as specified by the manufacturers of such temperature-sensitive components is used.

Another method for temperature compensation consists of heating the temperature-sensitive components, the measuring device or even the entire equipment up to a fixed operating temperature that is always higher than the ambient temperature which might prevail. This heating up process to the firmly defined operating temperature is performed by the heating device. This heating device is provided solely for the purpose of heating and has no further function for the subsequent measurements or for the equipment as is the case, for example, in heated quartz oscillators.

A disadvantage with this method, however, is that when measuring the temperature sensitivity in each individual measuring system the production times for the measuring system lengthen enormously when external heating is applied on account of the large thermal time constants. All methods described here are either very expensive, very inaccurate or very elaborate and the long-term behavior of the temperature-sensitive components is not allowed for. Here too, external components are required that must also be placed in the equipment simply because of their heating capability.

SUMMARY OF THE INVENTION

The object of the invention is to provide a method that can be realized at a reasonable cost, exhibiting high accuracy even with cheap temperature-sensitive components and making allowance for their long-term behavior.

According to the invention a component that is already needed for the measuring system is operated in such a way that it heats up and at the same time the instantaneous temperature coefficient is measured or a defined operating temperature is reached or a temperature-independent operating point is set. The basic idea with all three main claims is to demonstrate a method for temperature compensation that requires no external components, whose sole function is to compensate for the temperature effect, but to make use of already provided components to also take over other functions in the equipment or measuring device, for heating or for setting the operating point.

The advantages obtained with the invention are that no additional components are required that substantially or solely serve to heat up the system or to set it at a favorable operating point. This method makes use of the fact that the temperature-sensitive components themselves, or adjacent electronic components that are already required for the measuring system, take over this function. This allows the required amount of heat to get to the temperature-sensitive components quickly and without loss, for example in the event of a temperature rise. If the temperature does rise, this can be accomplished very quickly, with low loss, and objectively.

In accordance with advantageous further developments, methods will be described in which the temperature-sensitive components are primarily an actuator or a sensor. During the heating process, however, they would be used as heating element and possibly as temperature sensor at the same time. In a specific case, the component can be a light emitting diode or a light-sensitive receiver or photoresistor. The systems employed here can either be slightly coupled thermally or well coupled thermally, as described for another advantageous method. In this method, a temperature-sensitive pressure sensor is heated up by its resistors or diodes that are operated between the actual measuring process in such a way that they supply the necessary amount of heat to the system.

BRIEF DESCRIPTION OF THE DRAWINGS

The method will now be described and explained by way of embodiment examples in conjunction with the Figures.

DESCRIPTION OF THE PREFERRED EMBODIMENTS

Figure 1:
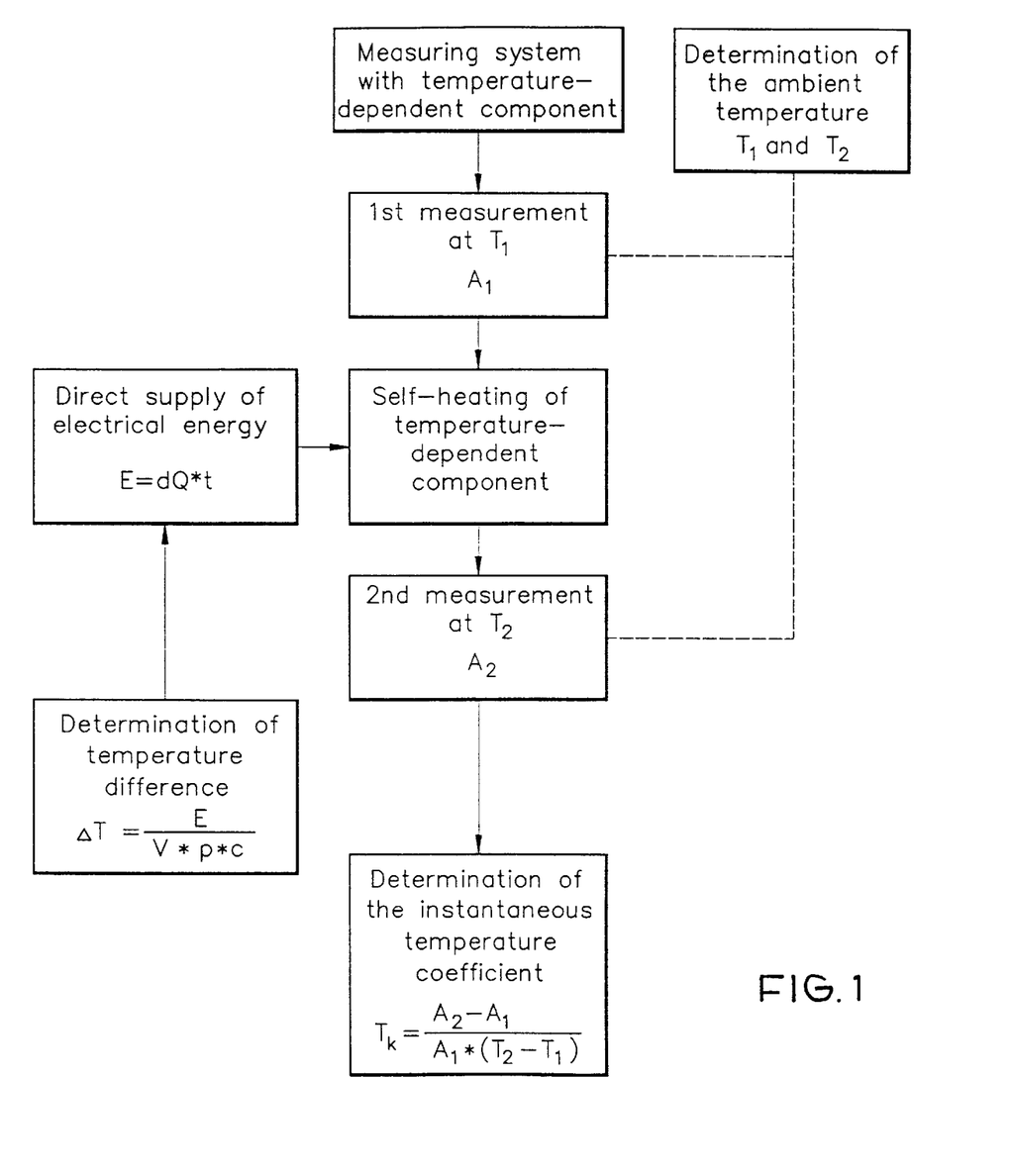
FIG. 1: Flowchart for determining the instantaneous temperature coefficient

FIG. 1 shows a flowchart for determining the instantaneous temperature coefficient. A measuring system that can also be part of an item of equipment contains one or more temperature-dependent components. If no methods for temperature compensation are used, the measuring result can be corrupted by the temperature-dependent component because it contributes to different results being obtained at different temperatures. In the case described here, the instantaneous temperature coefficient is specified for temperature compensation. Here, in a first so-called compensation measurement under specific operating conditions, that is at a specific temperature $T_1$ and with specific measurement parameters, a value $A_1$ is determined with the measuring system. The temperature-dependent component is then operated in such a way that it heats up to the temperature $T_2$. This takes place by electrical energy being supplied to it in the form of current and voltage, where: $E=dQ*t=dU*dI*t$. This means that the temperature-dependent component which can consist, for example, of a light emitting diode, a photodiode or a phototransistor, a transistor, a zener diode, a photoresistor or a resistor or another component which can be so operated that it heats up, or which is situated in the immediate vicinity of a neighboring component, which heats up on its own, or which is heated up by a neighboring component. The neighboring component that heats up the temperature-dependent component must here also assume a function other than exclusively being responsible for heating up in the equipment or measuring device because otherwise the cost-saving effect would no longer be relevant. This neighboring component must be of use to the measuring system or the equipment even without temperature compensation. After the heating-up phase, the temperature-dependent component has a temperature of $T_2$. At this temperature $T_2$, a second measured value $A_2$ is determined under operating conditions that are otherwise unchanged. It should be stated here that the component would not be temperature-dependent if the measuring system were to measure $A_1=A_2$. Since this is generally not the rule, however, the temperature coefficient must be determined for the temperature compensation. The temperature coefficient specifies by which value the measured value can be varied per kelvin. The temperature coefficient can either be constant here over the entire temperature range or it can vary according to the respective operating conditions. In the former case, a single measurement followed by storing of the temperature coefficient would suffice. In the latter case, however, the temperature coefficient would have to be determined under widely varying operating conditions and then stored so that the precise value is always available according to the respective operating condition under which a measurement takes place. The temperature coefficient is derived from $$T_K = \frac{A_2 - A_1}{A_1 * (T_2 - T_1)}.$$

The values $A_1$ and $A_2$ are known. As shown in FIG. 1, the temperature difference $\Delta T=T_2-T_1$ can be determined in different ways. The broken line signifies that in the 1st and 2nd compensation measurements the temperature is recorded before the difference is formed. Provided the thermal conduction in the environment is low, another possibility is to calculate the temperature difference from $$\Delta T = \frac{E}{V*\rho*c},$$

where $E=dU*dI*t$ represents the supplied electrical energy, V the volume and in particular the chip size, $\rho$ the density and c the specific thermal capacity of the component. The temperature coefficient $T_K$ can be calculated with the values that are now known. These measurements for determining the temperature coefficients can be repeated as required even under widely varying operating conditions so that the temperature coefficient is known for all operating conditions. In the actual measurement, that is when recording the desired measured quantity such as, for example, pressure, degree of contamination, the measured value M actually measured at a temperature T can be corrected with the help of the temperature coefficient $T_K$ to the correct temperature compensated value K actually determined at a standard temperature $T_0$, where: $K=M*(1+T_K*(T-T_0))$. These values corrected to the standard temperature then permit a reliable statement to be made and they can then be compared with one another.

These measurements for determining the temperature coefficient can be made both before and during operation. They can also be repeated at any time in the equipment or in the measuring system so that the long-term effects that alter the temperature coefficients can be eliminated computationally. In this method, no additional component parts are needed for the compensation measurements and even the temperature difference can be calculated. This method allows favorable components to be used whose temperature sensitivity has a wide scatterband and which have a high degradation over the time scale and at the same time guarantee a high degree of measuring accuracy. The compensation measurements are performed only at those times when no actual measurements take place.

Figure 2:
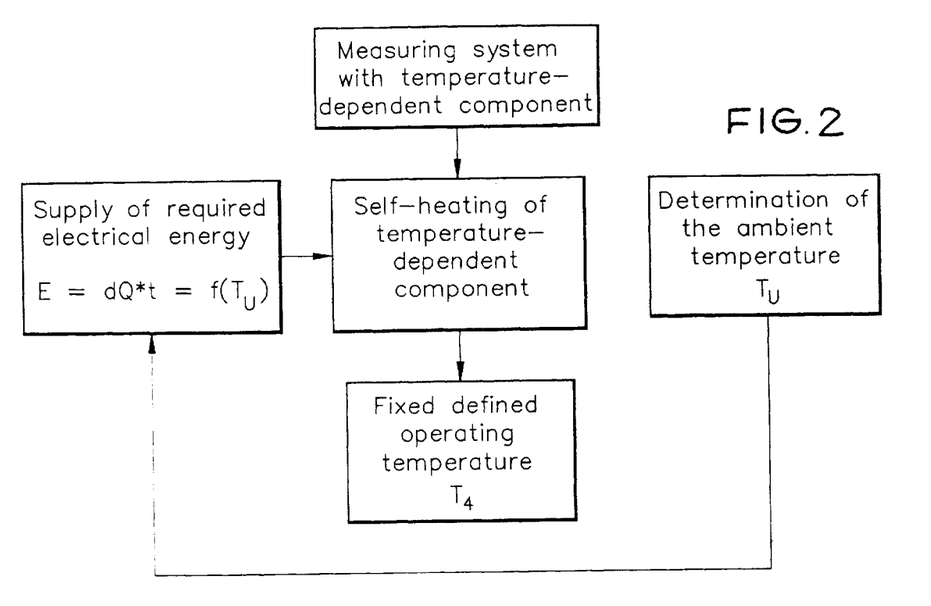
FIG. 2: Flowchart for heating up to a fixed operating temperature which is reached by supplying energy in an amount that depends on the ambient temperature

FIG. 2 shows a flowchart for achieving a constant, firmly defined operating temperature. A measuring system, which can also be part of an item of equipment, includes one or several temperature-dependent components. If no methods are used for temperature compensation, the measuring result can be corrupted by the temperature-dependent component because it contributes towards different results being obtained at different temperatures but otherwise identical operating conditions. In the case described here, the operating temperature of the temperature-sensitive components is simply kept at a constant value for the purposes of temperature compensation. At the same time, the temperature-sensitive component, or an immediately adjacent component, in the measuring system is operated in such a way that the temperature-sensitive component heats up to a firmly defined temperature $T_4$ which is selected at a high enough value to prevent the ambient temperature $T_U$ from causing any alteration. The temperature-sensitive component is operated before the actual measurement in such a way that it heats up to the temperature $T_4$, then the heating function of the component is interrupted during measurement and it is used for the measuring function. The amount of energy that must be supplied in order to reach the desired operating temperature is then calculated from $dU*dI*t=E=(T_4-T_u)*V*\rho*c$. As a rule, however, the measuring time is so short that no appreciable cooling takes place during the measurement. All further measurements are performed by the same method so that they take place at the same operating temperature.

Figure 3:
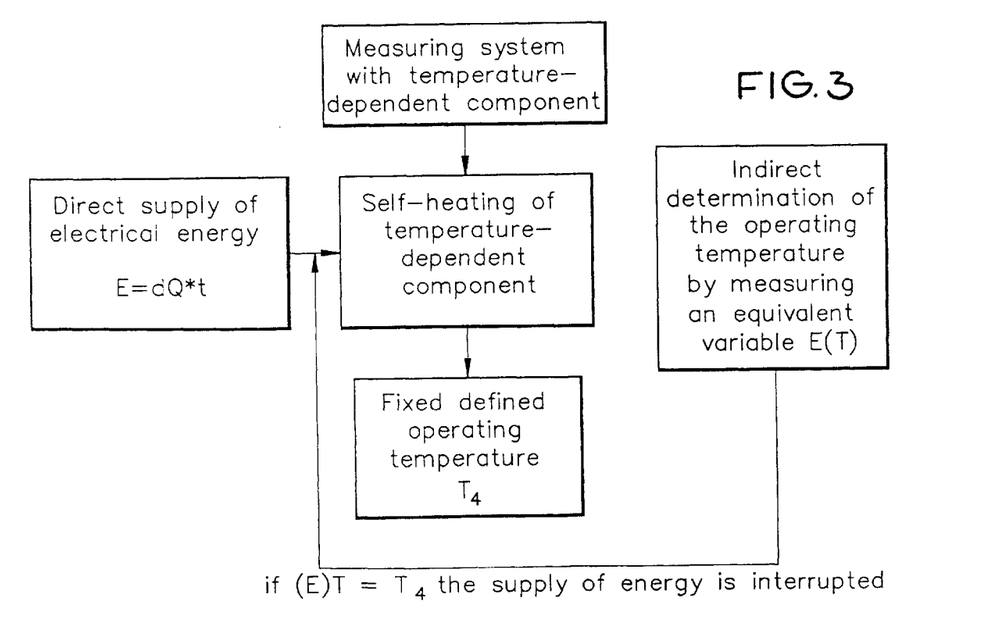
FIG. 3: Flowchart for heating up to a fixed operating temperature which is reached by supplying energy controlled by a temperature-dependent equivalent parameter of the component

FIG. 3 shows a flowchart for achieving a constant, firmly defined operating temperature as already described in FIG. 2. In this example of application, however, the energy required to achieve the desired operating temperature $T_4$ is not calculated but instead the operating temperature T is measured indirectly. When the desired operating temperature $T_4$ has been reached, the supply of energy is interrupted. For measuring the instantaneous operating temperature T of the component, a temperature-sensitive variable E(T) is used, such as the forward voltage of a diode, the temperature-sensitive component. The measured value of this variable corresponds to one specific temperature of the component so that this represents an indirect measurement of the operating temperature T. When the measured value of the variable corresponds to the desired operating temperature $T_4$, the supply of energy is stopped. The component can then be used for the actual measuring function. As a rule, the measuring time is so short that no appreciable cooling takes place during measurement. All further measurements are performed by the same method so that they take place at the same operating temperature.

Figure 4:
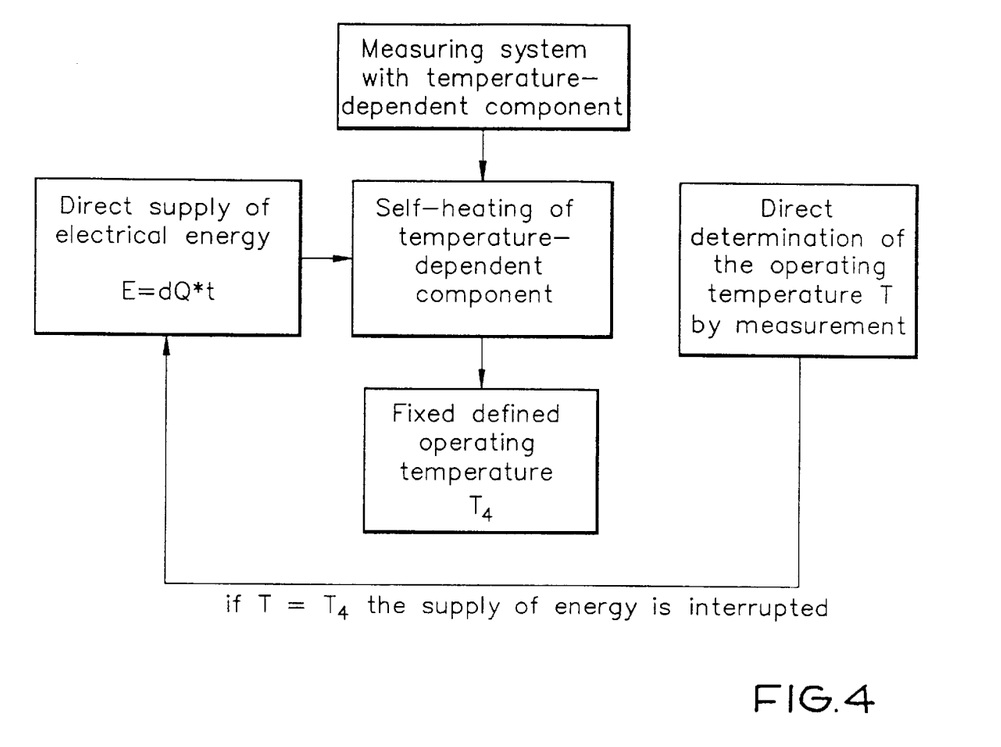
FIG. 4: Flowchart for heating up to a fixed operating temperature which is reached by supplying energy in an amount that depends on the component temperature

FIG. 4 shows a flowchart for achieving a constant, firmly defined operating temperature as already described in FIG. 2. In this example of application, however, the energy required to achieve the desired operating temperature $T_4$ is not calculated beforehand but instead the operating temperature T is measured directly. When the desired operating temperature $T_4$ has been reached, the supply of energy is interrupted. For measuring the instantaneous temperature T of the component in this case, as opposed to the example of application described in FIG. 3, a temperature sensor is used and not the component itself. When the desired operating temperature $T_4$ has been reached, the supply of energy is also interrupted here. The component can then be used for the actual measuring function. As a rule, the measuring time is so short that no appreciable cooling takes place during measurement. All further measurements are performed by the same method so that they take place at the same operating temperature.

Figure 5:
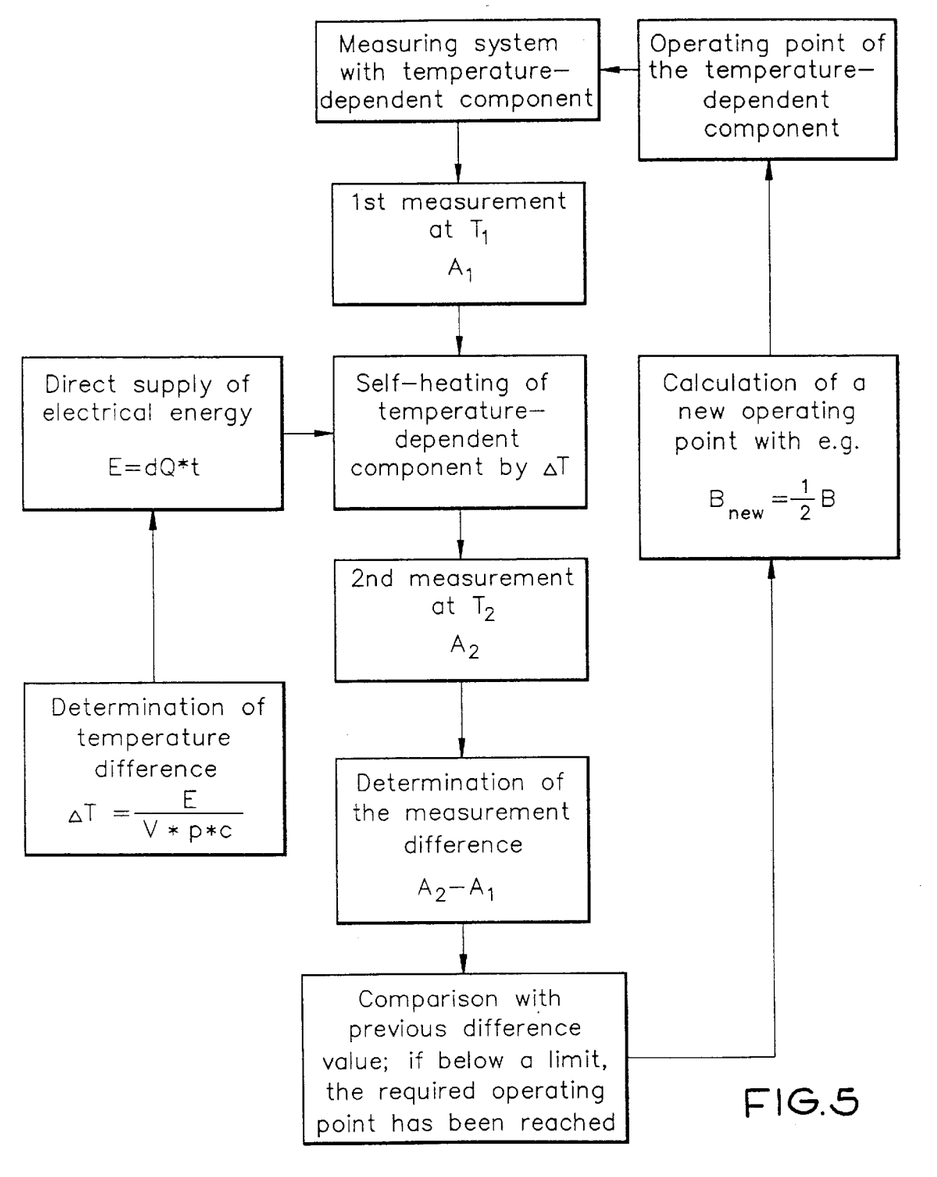
FIG. 5: Flowchart for determining an operating point with minimum temperature dependency
Figure 6:
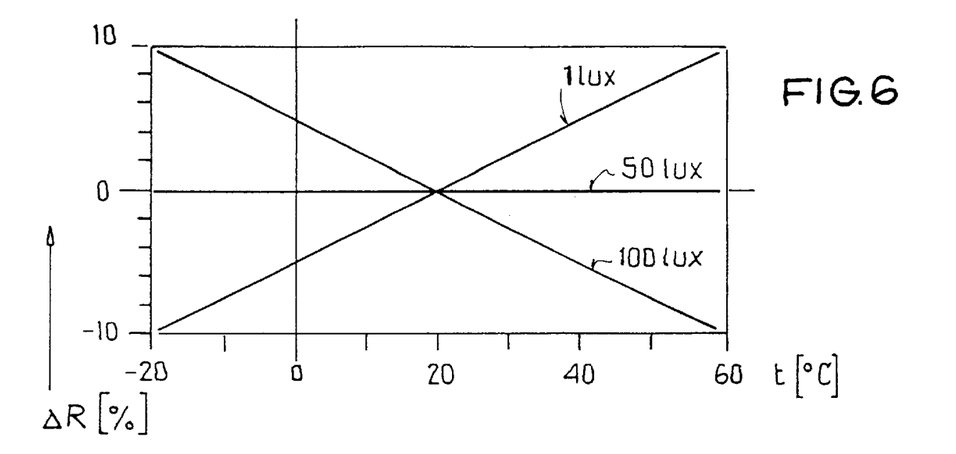
FIG. 6: Temperature variation of a photoresistor

FIG. 5 shows a flowchart for determining a temperature-independent operating point. A measuring system, which can also be part of an item of equipment, contains one or several temperature-dependent components. If no methods are applied for temperature compensation, the measuring result can be corrupted by the temperature-dependent component because it contributes towards different results being achieved at different temperatures. In the case described here, a temperature-independent operating point is determined. Such behavior is displayed by, for example, photoresistors whose temperature coefficient is positive in one range of radiation and negative in the other range of radiation. This characteristic is shown in FIG. 6. In FIG. 5, the value $A_1$ is determined in a first experimental measurement at a temperature $T_1$ under specific operating conditions B. The temperature-dependent component is then operated in such a way that it heats up to temperature $T_2$. This takes place by supplying it with electrical energy. While maintaining the operating conditions B, a second experimental measurement is performed. If different values result for $A_1$ and $A_2$, the measurement difference of $\Delta A = A_2 - A_1$ is recorded. This measuring process is then repeated. The temperature difference $\Delta T = T_2 - T_1$ established between the two measurements is retained and a new operating point, e.g., $$\frac{B_{neg}}{2} B,$$

is selected. For this operating point in turn, an experimental measurement difference results of $\Delta \overline{A} = A_4 - A_3$. This difference value is then compared with the previous difference and the process, i.e., the alteration of the operating condition, is repeated as many times as necessary until the difference value changes by only a minimal amount or not at all so that $\Delta \overline{A} = \Delta A$. When this value has been reached, the temperature-independent operating point B* has been found.

FIG. 6 shows the response to temperature changes for a photoresistor. Referring to the design as described under FIG. 3, the photoresistor is temperature-independent at a certain operating point, in this case a radiant power of B≈50 lux. At a radiant power of B≈1 lux, however, it would have a positive temperature coefficient and at a radiant power of B≈100 lux a negative temperature coefficient.

Figure 7:
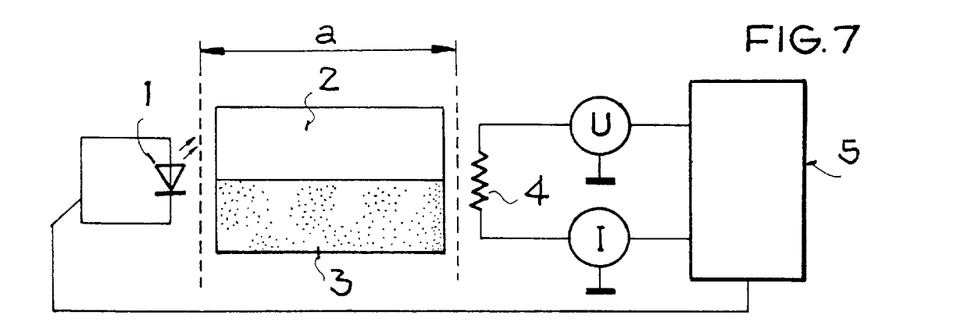
FIG. 7: Extinction sensor

FIG. 7 shows an extinction sensor in a washing machine. Here, a light emitting diode 1 as an actuator emits radiation. In the compensation measurement, the radiation passes over a measurement section a through a clear medium 2. In the extinction measurement, the medium is as a rule contaminated 3 and is weakened along the measurement section a to an extent that depends on the degree of contamination. The reduced radiation power then strikes a photoresistor 4 which then generates a current I that is proportional to the radiation for an applied voltage U. In this system, the light emitting diode 1 and the photoresistor 4 are temperature-dependent. This is of particular relevance when the soapy water is being heated and the measurements take place at various soapy water temperatures. In order to compensate the temperature-dependence of the light emitting diode 1, the compensation measurement is performed before the actual extinction measurement while the measurement section a is clear. The light emitting diode 1 is operated here with a higher current and/or a higher voltage so that it heats up on its own. Furthermore, a measured value is determined before and after heating up, in this case the current of the photoresistor and then, as described under FIG. 1, the instantaneous temperature coefficient. Subsequently, the photoresistor 4 is also operated with higher values before the actual measurement by, for instance, increasing the amount of incident radiation which leads to an increase in the power of the photoresistor and causes heating up to take place. Here too, before and after heating up, a measured value (i.e. the resulting current) is determined and the temperature coefficient is calculated as described under FIG. 1. When the temperature coefficients are known, the actual measurement takes place and the correction calculation in the microprocessor 5 as described above. In the case of the photoresistor 4, an alternative method can also be applied, as described under FIGS. 3 and 4. Here, the operating point, in this case the radiant intensity, is altered as long as necessary to make the photoresistor insensitive to temperature. In the application, this operating point is at B=50 lux.

Figure 8:
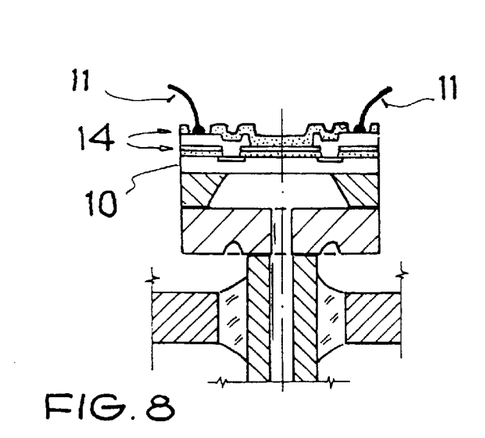
FIG. 8: Pressure sensor

FIG. 8 shows a pressure sensor of the type used, for example, in the automotive sector. An important part of this pressure sensor is the Si epitaxial layer 10 which acts as membrane. The properties of this membrane depend on the temperature. In the upper layers 14 on the membrane there are also other temperature-dependent electronic components such as resistors of a Wheatstone bridge, pseudo Hall resistors or parasitic elements such as, for example, the resistors isolated by the pn junctions and which act as diodes in the forward direction. Before a measurement, an electronic component of this type can be heated up through the supply conductors 11 by means of a higher current or through the applied voltage. The membrane 10 situated immediately below the component is also affected by this heating process. The energy supply is maintained until components and membrane reach a defined operating temperature which is determined, for example, over a temperature-dependent variable of the component. The supply of energy is then interrupted and the system is used for the measurement as described under FIGS. 2, 3 and 4. It is advantageous here that the measurements always take place under the same thermal operating conditions without additional devices being necessary. This applies similarly for a magnetic field sensor which is not illustrated here.

Figure 9:
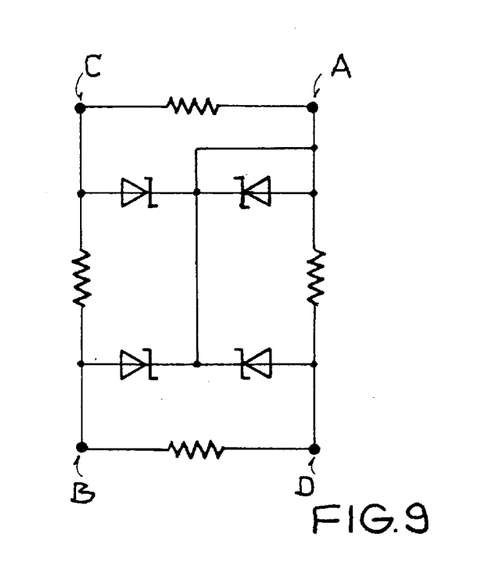
FIG. 9: Equivalent circuit diagram of a pressure sensor with bridged substrate diode

FIG. 9 shows an equivalent circuit diagram of a pressure sensor with bridged substrate diode at the plus terminal. If the plus terminal is placed at point A and the minus terminal at point B, this known device operates in the measurement mode. However, if the minus terminal is placed at point A and the plus terminal at point B, and if the points C and D are at a positive potential, the device can be used for the heating operation. It is therefore possible to realize several functions with one and the same component and where switching over from measurement mode to heating mode takes place very simply and quickly.

Another example of application, which is not illustrated, is provided by a chemical sensor. Here, in a dual/multi-gate MOS-FET, one gate is used for sensing chemical substances and the other gate for heating FETs. Or, if a MOS-FET is equipped with substrate diode, the diode is operated before or during measurement in such a way that it is used for heating the FET by means of temperature determination through measurement of the forward voltage up to a defined operating temperature and subsequently the measured value is taken from the FET.

What is claimed is:

1. Method for temperature compensation in measuring systems which can also be part of an item of equipment, that are dependent on the operating temperature whose temperature dependency is caused by one of several temperature-sensitive components with a temperature, coefficient, and that can be operated electronically or are linked thermally with a neighboring electronically driven component which is already required for the measuring systems, said method comprising:

effecting the temperature compensation with the help of the instantaneous temperature coefficient;

determining the instantaneous temperature coefficient by heating up the temperature-sensitive components; and causing the heating by one of the temperature-sensitive component itself and the neighboring electronically driven component.

2. Method for temperature compensation in measuring systems which can also be part of an item of equipment, that are dependent on the operating temperature, whose temperature dependency is caused by one of several temperature-sensitive components with a temperature coefficient, and that can be operated electronically or are linked thermally with a neighboring electronically driven component, which is already required for the measuring system, said method comprising:

heating the temperature-sensitive component to a defined fixed operating temperature; and, causing heating by use of the temperature-sensitive component itself and the neighboring electronically driven component.

3. Method for temperature compensation in measuring systems which can also be apart of an item of equipment, that are dependent on the operating temperatures whose temperature dependency is caused by one or several temperature-sensitive components with a temperature coefficient, and that can be operated electronically or are linked thermally with a neighboring electronically driven component, which is already required for the measuring, said method comprising determining a temperature insensitive operating point of the temperature-sensitive component; and setting the determined temperature insensitive operating point for the temperature sensitive component.

4. Method in accordance with patent claim 1, wherein the temperature-sensitive component is an actuator that converts an electrical signal into a non-electrical signal or the temperature-sensitive component is a sensor that converts a non-electrical signal into an electrical signal.

5. Method in accordance with patent claim 2, wherein the temperature-sensitive component is an actuator that converts an electrical signal into a non-electrical signal or the temperature-sensitive component is a sensor that converts a non-electrical signal into an electrical signal.

6. Method in accordance with patent claim 3, wherein the temperature-sensitive component is an actuator that converts an electrical signal into a non-electrical signal or the temperature-sensitive component is a sensor that converts a non-electrical signal into an electrical signal.

7. Method in accordance with patent claim 1, wherein the temperature-sensitive component comprises a light emitting diode which converts an electrical signal into a light or radiation signal, in particular a light emitting diode or a laser or a light-sensitive receiver which converts a light or radiation signal into an electrical signal, in particular a photoresistor or photodetector.

8. Method in accordance with patent claim 2, wherein the temperature-sensitive component comprises a light emitting diode which converts an electrical signal into a light or radiation signal, in particular a light emitting diode or a laser or a light-sensitive receiver which converts a light or radiation signal into an electrical signal, in particular a photoresistor or photodetector.

9. Method in accordance with patent claim 3, wherein the temperature-sensitive component comprises a light emitting diode which converts an electrical signal into a light or radiation signal, in particular a light emitting diode or a laser or a light-sensitive receiver which converts a light or radiation signal into an electrical signal, in particular a photoresistor or photodetector.

10. Method in accordance with patent claim 1, further including before and after the heating up process, measuring a sensor signal in order to determine the instantaneous temperature coefficient of an actuator or sensor.

11. Method in accordance patent claim 3, wherein the step of setting the temperature-insensitive operating point is performed by measuring the temperature coefficient under various operating conditions over a period of time until the temperature coefficient changes sign or reaches a minimum and storing these temperature-insensitive operating conditions.

12. Method in accordance with patent claim 2, wherein: the temperature sensitive component is one of a pressure sensor and a magnetic field sensor containing one of several resistors, in the form of one of a Wheatstone bridge, a Hall or pseudo Hall Sensitive resistor, and one or several substrate diodes; and this internal resistor or the substrate diode is used before or during the measurement to heat up and to determine the temperature of the pressure of magnetic field sensor, with the pressure or magnetic field sensor always having the same operating temperature at the time of measurement.

13. Method in accordance with patent claim 1, wherein the one of the temperature sensitive component and the neighboring electronically driven component is a zener diode that serves as a voltage reference, and the heating up to a defined temperature is achieved by applying a forward voltage to cause current to flow in the forward direction while at same time measuring the temperature before use is made of the reference voltage value.

14. Method in accordance with patent claim 2, wherein the one of the temperature sensate component and the neighboring electronically driven component is a zener diode that serves as a voltage reference, and the step of heating up to a defined temperature is achieved by applying a forward voltage to cause current to flow in the forward direction while at the same time measuring the temperature before use is made of the reference voltage value.

15. Method in accordance with patent claim 3, wherein the one of the temperature-sensitive component and the neighboring electronically driven component is a zener diode that serves as a voltage reference, and the step of determining includes heating the zener diode up a defined temperature by applying a forward voltage to cause current to flow in the forward direction while at the same time measuring the temperature before use is made of the reference voltage value.

16. Method in accordance with patent claim 2, wherein the step of heating the component to a fixed operating temperature is accomplished by one of indirectly determining the temperature of the component, and thus the operating temperature by measurement of a temperature-dependent variable of the component and stopping the further supply of energy to the component on reaching the operating temperature, and directly measuring the temperature of the component, and thus the operating temperature, by use of a temperature sensor and stopping the further supply of energy to the component on reaching the desired operating temperature, and calculating the energy required to reach the operating temperature and supplying it to the component.

* * * * *